US008817437B2

United States Patent
Peng et al.

(10) Patent No.: US 8,817,437 B2
(45) Date of Patent: Aug. 26, 2014

(54) HIGH VOLTAGE OPEN-DRAIN ELECTROSTATIC DISCHARGE (ESD) PROTECTION DEVICE

(71) Applicant: Amazing Mircoelectronic Corp., New Taipei (TW)

(72) Inventors: James Jeng-Jie Peng, Guanyin Township, Taoyuan County (TW); Chih-Hao Chen, Taipei (TW); Ryan Hsin-Chin Jiang, Taipei (TW)

(73) Assignee: Amazing Microelectronics Corp., New Taipei (TW)

( * ) Notice: Subject to any disclaimer, the term of this patent is extended or adjusted under 35 U.S.C. 154(b) by 93 days.

(21) Appl. No.: 13/733,712

(22) Filed: Jan. 3, 2013

(65) Prior Publication Data

US 2014/0185167 A1 Jul. 3, 2014

(51) Int. Cl.
*H02H 9/00* (2006.01)
*H02H 9/04* (2006.01)

(52) U.S. Cl.
CPC .................... *H02H 9/044* (2013.01)
USPC ........................................................... 361/56

(58) Field of Classification Search
USPC .................................................. 361/56
See application file for complete search history.

(56) References Cited

U.S. PATENT DOCUMENTS

| | | | | |
|---|---|---|---|---|
| 5,825,600 | A * | 10/1998 | Watt ................................. | 361/56 |
| 6,144,542 | A * | 11/2000 | Ker et al. ........................ | 361/111 |
| 6,356,063 | B1 | 3/2002 | Brooks | |
| 8,462,473 | B2 * | 6/2013 | Deval et al. ..................... | 361/56 |
| 2002/0085328 | A1 * | 7/2002 | Liu et al. ......................... | 361/56 |
| 2006/0268478 | A1 * | 11/2006 | Lai et al. ......................... | 361/56 |
| 2009/0213507 | A1 | 8/2009 | Chen et al. | |
| 2009/0213508 | A1 * | 8/2009 | Hsihe et al. ..................... | 361/56 |

FOREIGN PATENT DOCUMENTS

| | | |
|---|---|---|
| TW | I242875 | 11/2005 |
| TW | I278094 | 4/2007 |
| TW | 200849540 | 12/2008 |
| TW | 200937607 | 9/2009 |

OTHER PUBLICATIONS

M.-D. Ker, C.-C. Yen and P.-C. Shih, "On-chip transient detection circuit for system-Level ESD protection in CMOS integrated circuits to meet electromagnetic compatibility regulation", IEEE Transactions on Electromagnetic Compatibility, pp. 1-9, vol. 50, No. 1, Feb. 2008.

* cited by examiner

*Primary Examiner* — Scott Bauer

(74) *Attorney, Agent, or Firm* — Muncy, Geissler, Olds & Lowe, P.C.

(57) ABSTRACT

A high voltage open-drain electrostatic discharge (ESD) protection device is disclosed, which comprises a high-voltage n-channel metal oxide semiconductor field effect transistor (HV NMOSFET) coupled to a high-voltage pad and a low-voltage terminal and receiving a high voltage on the high-voltage pad to operate in normal operation. The high-voltage pad and the HV NMOSFET are further coupled to a high-voltage ESD unit blocking the high voltage, and receiving a positive ESD voltage on the high-voltage pad to bypass an ESD current when an ESD event is applied to the high-voltage pad. The high-voltage ESD unit and the low-voltage terminal are coupled to a power clamp unit, which receives the positive ESD voltage via the high-voltage ESD unit to bypass the ESD current.

19 Claims, 15 Drawing Sheets

HIGH VOLTAGE OPEN-DRAIN ELECTROSTATIC DISCHARGE (ESD) PROTECTION DEVICE

BACKGROUND OF THE INVENTION

1. Field of the Invention

The present invention relates to a protection design, particularly to a high voltage open-drain electrostatic discharge (ESD) protection device.

2. Description of the Related Art

The open-drain I/O cell design is used for the application that the external voltage applied on the I/O pad is higher than the internal supply voltage of the I/O cell library. For a high-voltage (HV) open-drain buffer, it does not contain a high-voltage p-channel metal oxide semiconductor field effect transistor (HV PMOSFET, also known as HV PMOS) device connected to the core power line, so that the I/O pads can sustain a voltage higher than the supply voltage. Therefore, it is difficult to have a good ESD protection capability for an open-drain buffer.

Refer to FIG. 1, the conventional multiple channel high voltage open-drain buffer uses the ESD bus to reduce the size of the open-drain buffer, wherein every open-drain channel shares the same ESD clamp element 10 to release the ESD current. As shown in FIG. 2, the ESD protection capability is improved by the HV trigger circuit 12 to efficiently trigger on the ESD clamp element 10 when an ESD event appears on the open-drain I/O pad. The HV trigger circuit 12 is generally composed of a resistor, a capacitor, and a HV inverter. The HV inverter includes a HV PMOS and a high-voltage n-channel metal oxide semiconductor field effect transistor (HV NMOSFET, also known as HV NMOS). When an ESD event occurs, the HV trigger circuit 12 fully turns on the ESD clamp element 10 to provide a lower impedance ESD discharging path to bypass the ESD current. However, the original open-drain I/O cell does not include a HV PMOS, therefore, the mask layer number will be increased by taking an additional HV PMOS of the HV inverter, which means that the cost of the IC fabrication process is increased.

To overcome the abovementioned problems, the present invention provides a new HV open-drain ESD protection design, so as to solve the abovementioned problems of the prior art.

SUMMARY OF THE INVENTION

A primary objective of the present invention is to provide a high voltage open-drain electrostatic discharge (ESD) protection device, which installs a high-voltage ESD unit between a high-voltage pad and a power clamp unit. The high-voltage ESD unit not only blocks the high voltage supply applied on the high-voltage pad in normal operation but also bypasses the ESD current when an ESD event occurs. The open-drain ESD protection device includes only a high-voltage n-channel metal oxide semiconductor field effect transistor (HV NMOSFET, also known as HV NMOS), and no extra mask layer is needed (without any additional high-voltage p-channel metal oxide semiconductor field effect transistor, HV PMOSFET, also known as HV PMOS), thereby achieving low cost requirement.

To achieve the abovementioned objectives, the present invention provides a high voltage open-drain ESD protection design, which comprises a HV NMOSFET coupled to a high-voltage pad and a low-voltage terminal. The HV NMOSFET receives a high voltage on the high-voltage pad to operate in normal operation. The high-voltage pad and the HV NMOS-FET are further coupled to a high-voltage ESD unit for blocking the high voltage applied on the high-voltage pad during normal operation condition, and bypassing a positive ESD current or a negative ESD current when an ESD event is applied to the high-voltage pad. The high-voltage ESD unit and the low-voltage terminal are coupled to a power clamp unit, which receives the positive ESD voltage via the high-voltage ESD unit to bypass the first ESD current flowing from the high-voltage pad to the low-voltage terminal through the high-voltage ESD unit and the power clamp unit. Alternatively, the second ESD current flows from the low-voltage terminal to the high-voltage pad through the power clamp unit and the high-voltage ESD unit when the high-voltage ESD unit receives the negative ESD voltage.

Below, the embodiments are described in detail in cooperation with the drawings to make easily understood the technical contents, characteristics and accomplishments of the present invention.

DETAILED DESCRIPTION OF THE INVENTION

Figure 1:
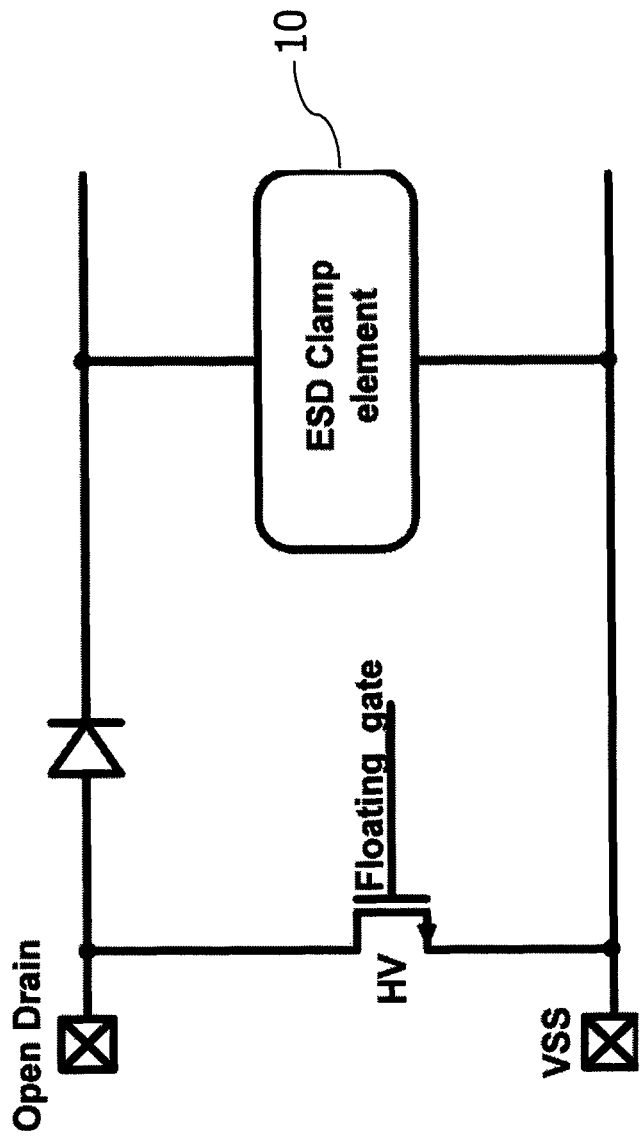
FIG. 1 is a circuit diagram schematically showing a conventional high voltage open-drain buffer.
Figure 2:
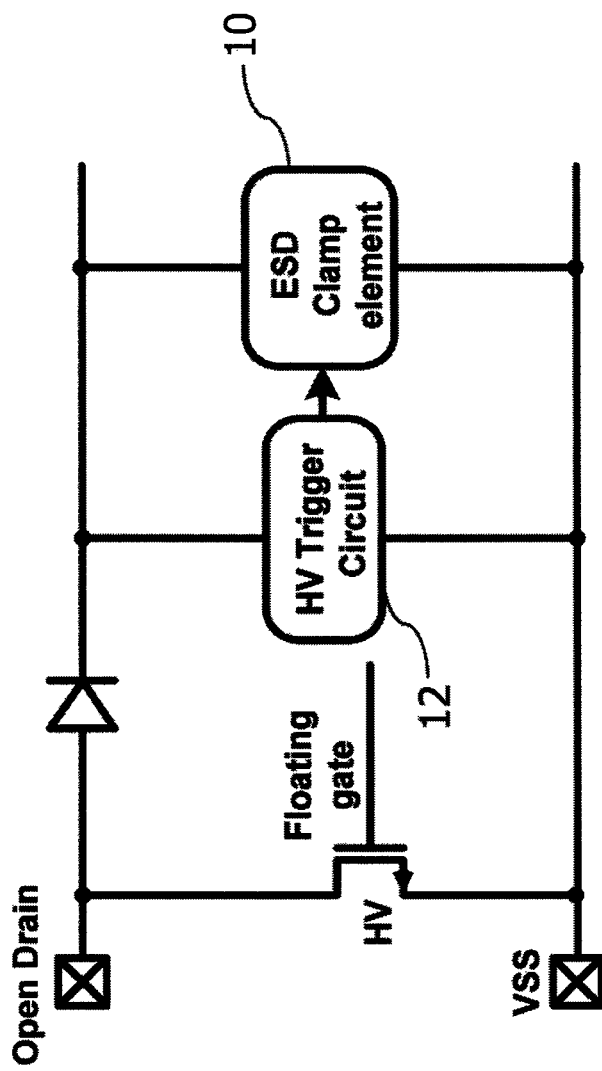
FIG. 2 is a circuit diagram schematically showing a conventional high voltage open-drain buffer with a high-voltage trigger circuit.
Figure 3:
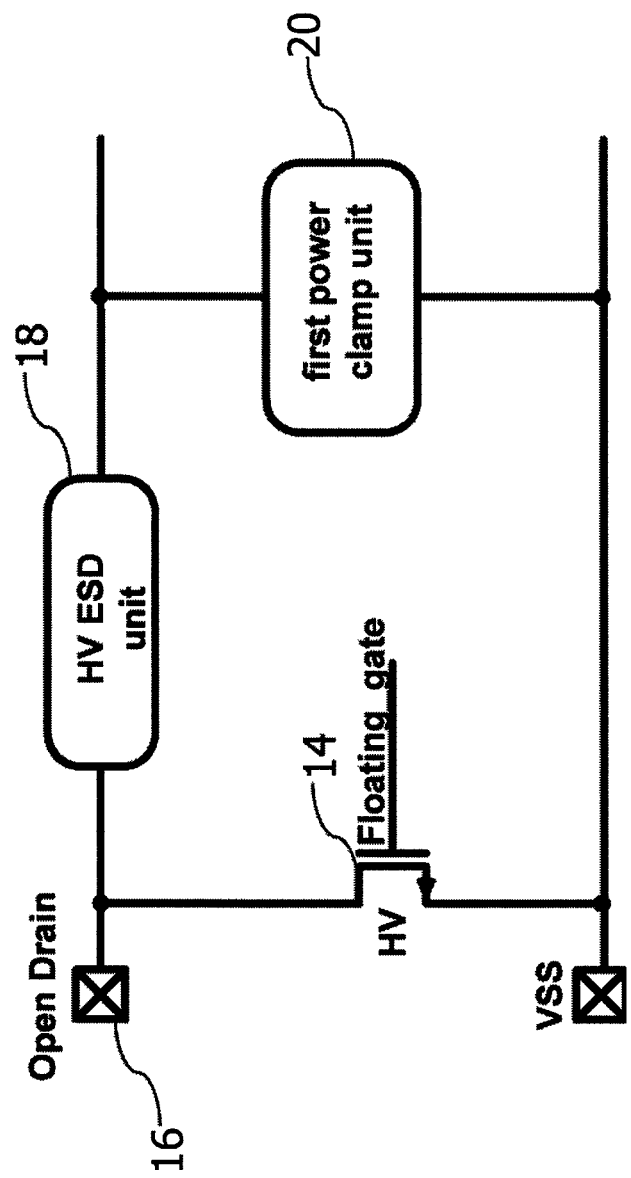
FIG. 3 is a circuit diagram schematically showing a high voltage open-drain electrostatic discharge (ESD) protection device with a high-voltage ESD unit and a power clamp unit according to an embodiment of the present invention.

Refer to FIG. 3. The present invention comprises a first high-voltage n-channel metal oxide semiconductor field effect transistor (HV NMOSFET) 14 coupled to a high-voltage pad 16 and a low-voltage terminal VSS and receiving a high voltage signal on the high-voltage pad 16 to operate in the normal operation, wherein the gate of the first HV NMOSFET 14 is floating. The high-voltage pad 16 and the first HV NMOSFET 14 are coupled to a high-voltage (HV) ESD unit 18, which is used for blocking the high voltage when normal operation and receiving a positive ESD voltage or a negative ESD voltage on the high-voltage pad 16 to bypass a first ESD current or a second ESD current respectively when an ESD event is applied to the high-voltage pad 16. The high-voltage ESD unit 18 and the low-voltage terminal VSS are coupled to a first power clamp unit 20. The first power clamp unit 20 receives the positive ESD voltage via the high-voltage ESD unit 18 to bypass the first ESD current. Alternatively, the second ESD current flows from the low-voltage terminal to the high-voltage pad 16 through the first power clamp unit 20 and the high-voltage ESD unit 18 when the high-voltage ESD unit 18 receives the negative ESD voltage.

The high-voltage ESD unit 18 and the first power clamp unit 20 provide an ESD discharge path to bypass the first ESD current from the high-voltage pad 16 to the low-voltage terminal VSS when the high-voltage ESD unit 18 and the first power clamp unit 20 face a positive ESD voltage potential.

For the operation of the embodiment, the first HV NMOSFET 14 receives the high voltage on the high-voltage pad 16 to operate in the normal operation. At the same time, the high-voltage ESD unit 18 blocks the high voltage, so that the first power clamp unit 20 will not be triggered on. When the positive ESD voltage appears at the high-voltage pad 16, the first ESD current flows from the high-voltage pad 16 to the low-voltage terminal VSS through the high-voltage ESD unit 18 and the first power clamp unit 20. When the negative ESD voltage appears at the high-voltage pad 16, the second ESD current flows from the low-voltage terminal VSS to the high-voltage pad 16 through the first power clamp unit 20 and the high-voltage ESD unit 18.

The high-voltage ESD unit 18 can be realized with six kinds of bypass circuits, and the first power clamp unit 20 can be realized with two kinds of clamp circuits. The embodiments with different bypass circuits and clamp circuits are introduced as below, wherein the low-voltage terminal has the grounding voltage.

Figure 4:
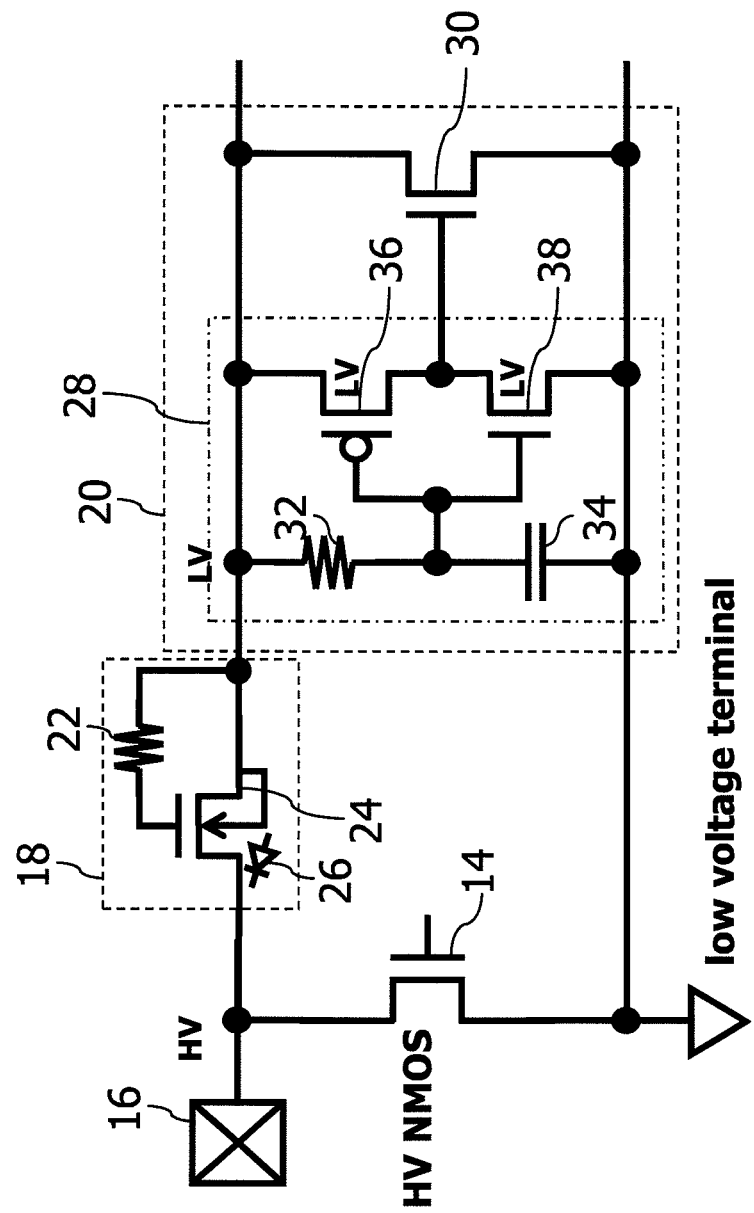
FIG. 4 schematically shows the block diagram of a protection design according to the first embodiment of the present invention.

The first embodiment is firstly introduced. Refer to FIG. 4. The high-voltage ESD unit 18 comprises a resistor 22 and a second HV NMOSFET 24. The second HV NMOSFET 24 has the drain coupled to the first HV NMOSFET 14 and the high-voltage pad 16, and the source of the second HV NMOSFET 24 is coupled to the first power clamp unit 20. Two ends of the resistor 22 are respectively coupled to the source and the gate of the second HV NMOSFET 24, the source is coupled to the body of the second HV NMOSFET 24. The second HV NMOSFET 24 has a parasitic drain-to-gate capacitor between the drain and the gate and a parasitic drain-to-body reversed junction diode 26 between the drain and the body, wherein the parasitic drain-to-body reversed junction diode 26 blocks the high voltage or receives the negative ESD voltage to bypass the second ESD current. The parasitic drain-to-gate capacitor and the resistor 22 receive the positive ESD voltage to turn on the second HV NMOSFET 24, whereby the second HV NMOSFET 24 bypasses the first ESD current.

The first power clamp unit 20 comprises a first trigger circuit 28 coupled to the source of the second HV NMOSFET 24 and the low-voltage terminal. The first trigger circuit 28 receives the positive ESD voltage via the second HV NMOSFET 24 and the resistor 22 to generate a trigger signal. The second HV NMOSFET 24, the resistor 22, the first trigger circuit and the low-voltage terminal are coupled to a first ESD clamp element 30. The first ESD clamp element 30 receives the trigger signal to be turned on, so that the first ESD current is bypassed by flowing from the high-voltage pad 16 to the low-voltage terminal through the second HV NMOSFET 24 and the first ESD clamp element 30. For instance, the first ESD clamp element 30 is an NMOSFET, such as a second low-voltage n-channel metal oxide semiconductor field oxide transistor (LV NMOSFET) or a third HV NMOSFET. The drain of the NMOSFET is coupled to the first trigger circuit 28 and the second HV NMOSFET 24 and the resistor 22, the source of the NMOSFET is coupled to the first trigger circuit 28 and the low-voltage terminal, and the gate of the NMOSFET is coupled to the first trigger circuit 28 to receive the trigger signal to bypass the first ESD current. When the parasitic drain-to-body reversed junction diode 26 receives the negative ESD voltage, the second ESD current flows from the low-voltage terminal to the high-voltage pad 16 through the first ESD clamp element 30 and the parasitic drain-to-body reversed junction diode 26.

The first trigger circuit 28 comprises a resistor 32 having a first terminal and a second terminal, wherein said first terminal is coupled to the source of the second HV NMOSFET 24 and the first ESD clamp element. A capacitor 34 has a first electrode and a second electrode, wherein the first electrode and the second electrode are respectively coupled to the second terminal and the low-voltage terminal, and wherein the capacitor 34 receives the positive ESD voltage through the second HV NMOSFET 24, the resistor 22 and the resistor 32 to establish a low voltage signal at the first electrode. The second terminal and the first electrode are coupled to the gate of a low-voltage p-channel metal oxide semiconductor field oxide transistor (LV PMOSFET) 36. The source of the LV PMOSFET 36 is coupled to the first terminal, the source of the second HV NMOSFET 24 and the first ESD clamp element 30. The second terminal and the first electrode are coupled to the gate of a first LV NMOSFET 38. The source of the first LV NMOSFET 38 is coupled to the second electrode, the first ESD clamp element 30, and the low-voltage terminal. The drain of the first LV NMOSFET 38 is coupled to the drain of the LV PMOSFET 36, wherein the LV PMOSFET 36 and the first LV NMOSFET 38, also known as an inverter, receive the low voltage signal to output the trigger signal.

The second HV NMOSFET 24 and the first ESD clamp element 30 provide the ESD discharge path to bypass the first ESD current from the high-voltage pad 16 to the low-voltage terminal VSS when the second HV NMOSFET 24 and the first ESD clamp element 30 face the positive ESD voltage potential.

For the operation of the first embodiment, the first HV NMOSFET 14 receives the high voltage on the high-voltage pad 16 to operate in the normal operation. At the same time, the parasitic drain-to-body reversed junction diode 26 blocks the high voltage, so that the first trigger circuit 28 and the first ESD clamp element 30 will not be triggered on. When the positive ESD voltage appears at the high-voltage pad 16, the resistor 22 receives the positive ESD voltage to turn on the second HV NMOSFET 24, and the capacitor 34 uses the positive ESD voltage to establish the low voltage signal at the first electrode. Then, the LV PMOSFET 36 and the first LV NMOSFET 38 receive the low voltage signal to output the trigger signal. The first ESD clamp element 30 receives the trigger signal to be turned on, so that the first ESD current flows from the high-voltage pad 16 to the low-voltage terminal through the resistor 22, the second HV NMOSFET 24 and the first ESD clamp element 30. When the negative ESD voltage appears at the high-voltage pad 16, the second ESD current flows from the low-voltage terminal to the high-voltage pad 16 through the first ESD clamp element 30 and the parasitic drain-to-body reversed junction diode 26.

Figure 5:
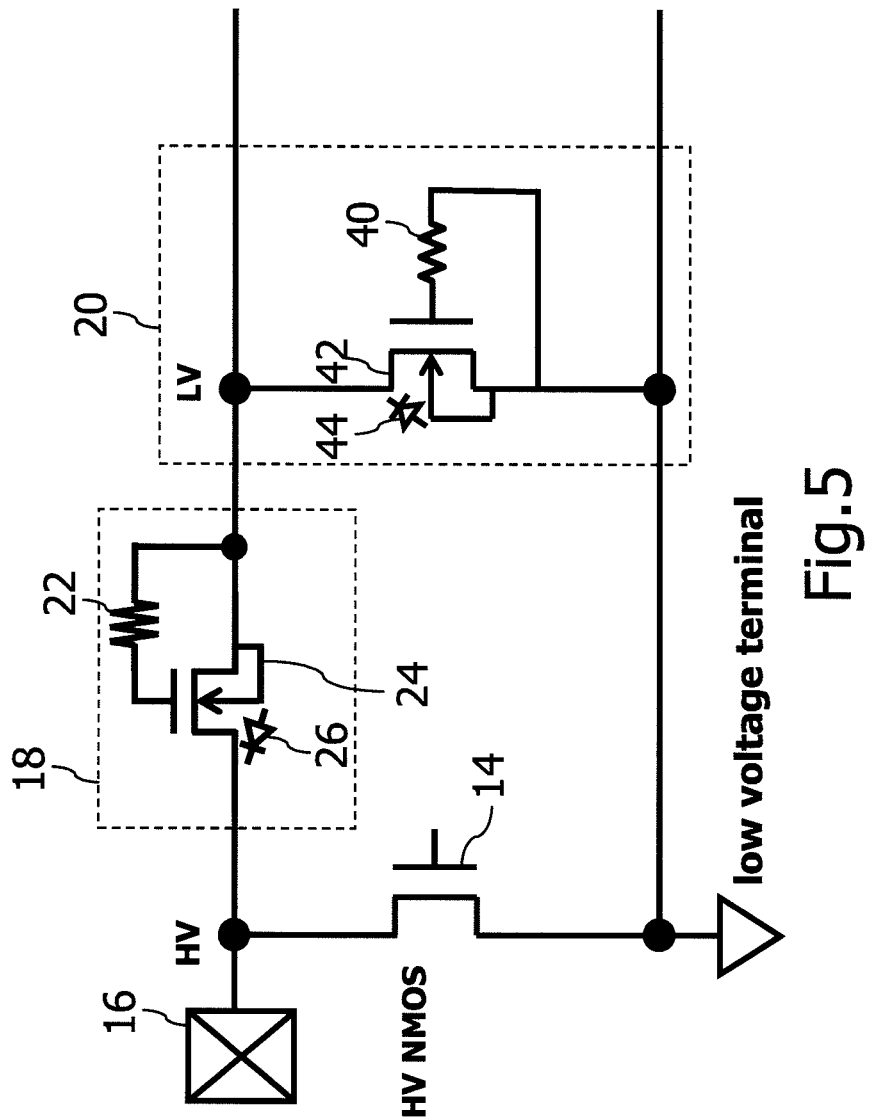
FIG. 5 schematically shows the circuit of a protection design according to the second embodiment of the present invention.

The second embodiment is introduced. Refer to FIG. 5. The second embodiment is different from the first embodiment in internal elements of the first power clamp unit 20. The first power clamp unit 20 comprises a resistor 40 and a clamp NMOSFET 42, such as a third LV NMOSFET or a forth HV NMOSFET. The drain of the clamp NMOSFET 42 is coupled to the resistor 22 and the second HV NMOSFET 24, and the source of the clamp NMOSFET 42 is coupled to the low-voltage terminal. Two ends of the resistor 40 are respectively coupled to the source and the gate of the clamp NMOSFET 42. The source and the body of the clamp NMOSFET 42 are coupled to each other. The clamp NMOSFET 42 has a parasitic drain-to-gate capacitor between the drain and the gate. The parasitic drain-to-gate capacitor and the resistor 40 receive the positive ESD voltage via the second HV NMOSFET 24 to turn on the clamp NMOSFET 42, whereby the clamp NMOSFET 42 and the resistor 40 bypass the first ESD current. Additional, the clamp NMOSFET 42 has a parasitic drain-to-body reversed junction diode 44 between the drain and the body, and the parasitic drain-to-body reversed junction diode 44 receives the negative ESD voltage via the second HV NMOSFET 24 to bypass the second ESD current.

Similarly, the clamp NMOSFET 42 can provide the abovementioned ESD discharge path to bypass the first ESD current from the high-voltage pad 16 to the low-voltage terminal VSS when the second HV NMOSFET 24 and the clamp NMOSFET 42 face the positive ESD voltage potential.

For the operation of the second embodiment, the first HV NMOSFET 14 receives the high voltage on the high-voltage pad 16 to operate in the normal operation. At the same time, the parasitic drain-to-body reversed junction diode 26 blocks the high voltage, so that the clamp NMOSFET 42 will not be triggered on. When the positive ESD voltage appears at the high-voltage pad 16, the resistors 22 and 40 receive the positive ESD voltage to turn on the second HV NMOSFET 24 and the clamp NMOSFET 42, respectively. Then, the first ESD current flows from the high-voltage pad 16 to the low-voltage terminal through the resistor 22, the second HV NMOSFET 24, the resistor 40 and the clamp NMOSFET 42. When the negative ESD voltage appears at the high-voltage pad 16, the second ESD current flows from the low-voltage terminal to the high-voltage pad 16 through the parasitic drain-to-body reversed junction diode 44 and the parasitic drain-to-body reversed junction diode 26.

Figure 6:
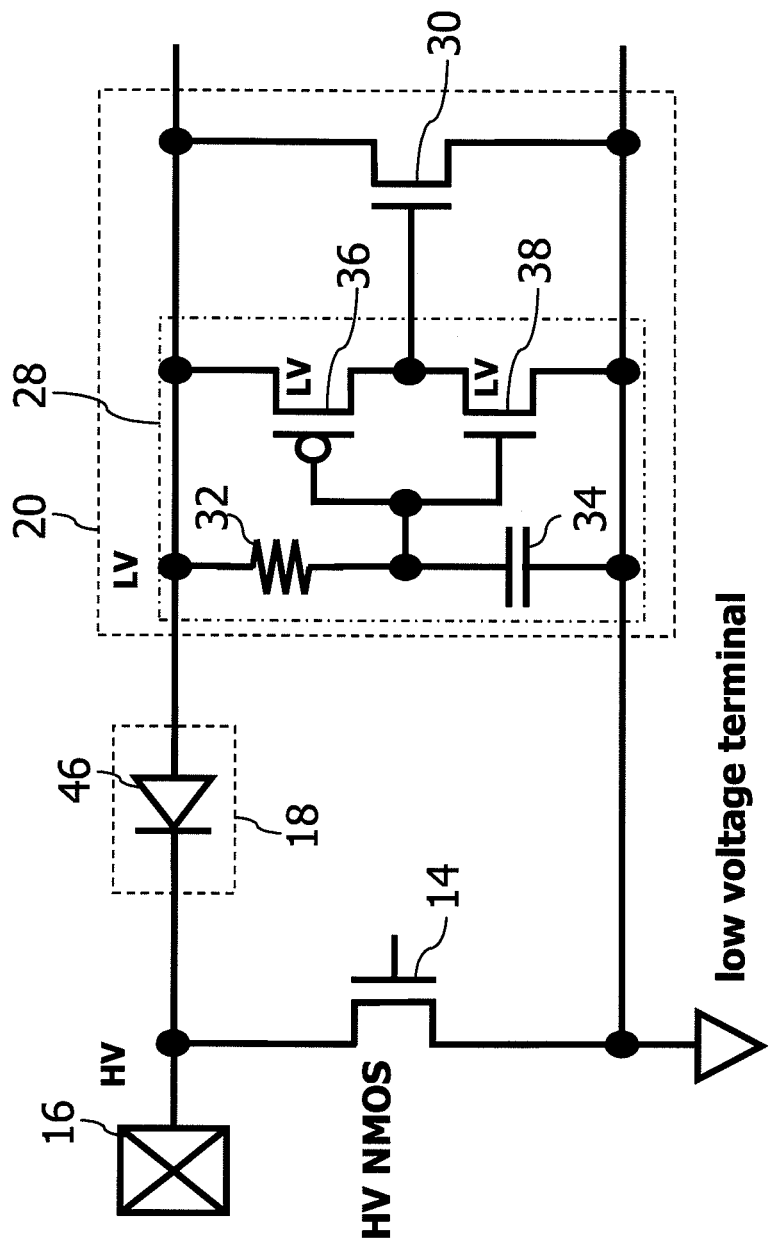
FIG. 6 schematically shows the circuit of a protection design according to the third embodiment of the present invention.

The third embodiment is introduced. Refer to FIG. 6. The third embodiment is different from the first embodiment in internal elements of the high-voltage ESD unit 18. The high-voltage ESD unit 18 is a diode 46, wherein an anode of the diode 46 is coupled to the resistor 32, the source of the LV PMOSFET 36 and the drain of the NMOSFET used as the first ESD clamp element 30, and a cathode of the diode 46 is coupled to the first HV NMOSFET 14 and the high-voltage pad 16.

The diode 46 can provide the abovementioned ESD discharge path to bypass the first ESD current from the high-voltage pad 16 to the low-voltage terminal VSS when the diode 46 and the first ESD clamp element 30 face the positive ESD voltage potential.

For the operation of the third embodiment, the first HV NMOSFET 14 receives the high voltage on the high-voltage pad 16 to operate in the normal operation. At the same time, the diode 46 blocks the high voltage, so that the first trigger circuit 28 and the first ESD clamp element 30 will not be triggered on. When the positive ESD voltage appears at the high-voltage pad 16, the capacitor 34 uses the positive ESD voltage to establish the low voltage signal at the first electrode. Then, the LV PMOSFET 36 and the first LV NMOSFET 38 receive the low voltage signal to output the trigger signal. The first ESD clamp element 30 receives the trigger signal to be turned on, so that the first ESD current flows from the high-voltage pad 16 to the low-voltage terminal through the diode 46 and the first ESD clamp element 30. When the negative ESD voltage appears at the high-voltage pad 16, the second ESD current flows from the low-voltage terminal to the high-voltage pad 16 through the first ESD clamp element 30 and the diode 46.

Figure 7:
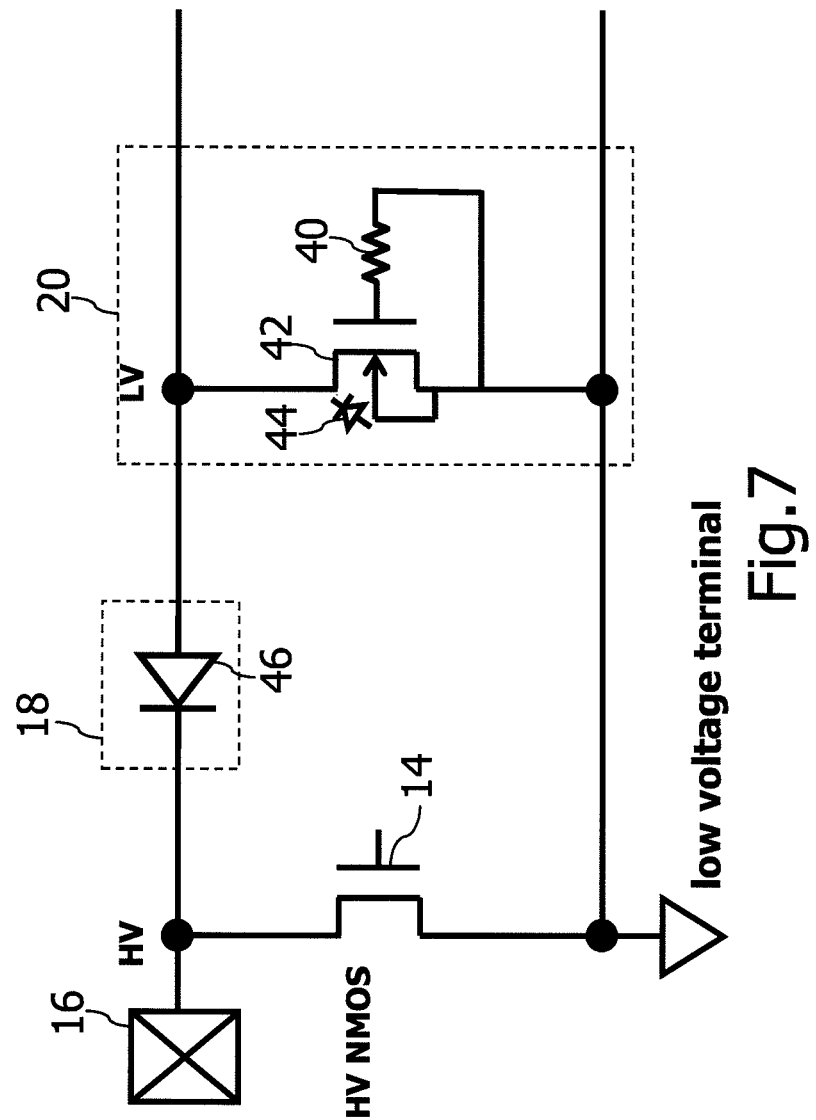
FIG. 7 schematically shows the circuit of a protection design according to the fourth embodiment of the present invention.

The fourth embodiment is introduced. Refer to FIG. 7. The fourth embodiment is different from the third embodiment in internal elements of the first power clamp unit 20. The first power clamp unit 20 comprises a resistor 40 and a clamp NMOSFET 42, such as a third LV NMOSFET or a forth HV NMOSFET. The drain of the clamp NMOSFET 42 is coupled to the resistor 22 and the anode of the diode 46, and the source of the clamp NMOSFET 42 is coupled to the low-voltage terminal. Two ends of the resistor 40 are respectively coupled to the source and the gate of the clamp NMOSFET 42. The source and the body of the clamp NMOSFET 42 are coupled to each other. The clamp NMOSFET 42 has a parasitic drain-to-gate capacitor between the drain and the gate. The parasitic drain-to-gate capacitor and the resistor 40 receive the positive ESD voltage via the diode 46 to turn on the clamp NMOSFET 42, whereby the clamp NMOSFET 42 and the resistor 40 bypass the first ESD current. Additional, the clamp NMOSFET 42 has a parasitic drain-to-body reversed junction diode 44 between the drain and the body, and the parasitic drain-to-body reversed junction diode 44 receives the negative ESD voltage via the diode 46 to bypass the second ESD current.

Similarly, the clamp NMOSFET 42 can provide the abovementioned ESD discharge path to bypass the first ESD current from the high-voltage pad 16 to the low-voltage terminal VSS when the diode 46 and the clamp NMOSFET 42 face the positive ESD voltage potential.

For the operation of the fourth embodiment, the first HV NMOSFET 14 receives the high voltage on the high-voltage pad 16 to operate in the normal operation. At the same time, the diode 46 blocks the high voltage, so that the clamp NMOSFET 42 will not be triggered on. When the positive ESD voltage appears at the high-voltage pad 16, the resistor 40 receives the positive ESD voltage via the diode 46 to turn on the clamp NMOSFET 42. Then, the first ESD current flows from the high-voltage pad 16 to the low-voltage terminal through the diode 46, the resistor 40 and the clamp NMOSFET 42. When the negative ESD voltage appears at the high-voltage pad 16, the second ESD current flows from the low-voltage terminal to the high-voltage pad 16 through the parasitic drain-to-body reversed junction diode 44 and the diode 46.

Figure 8:
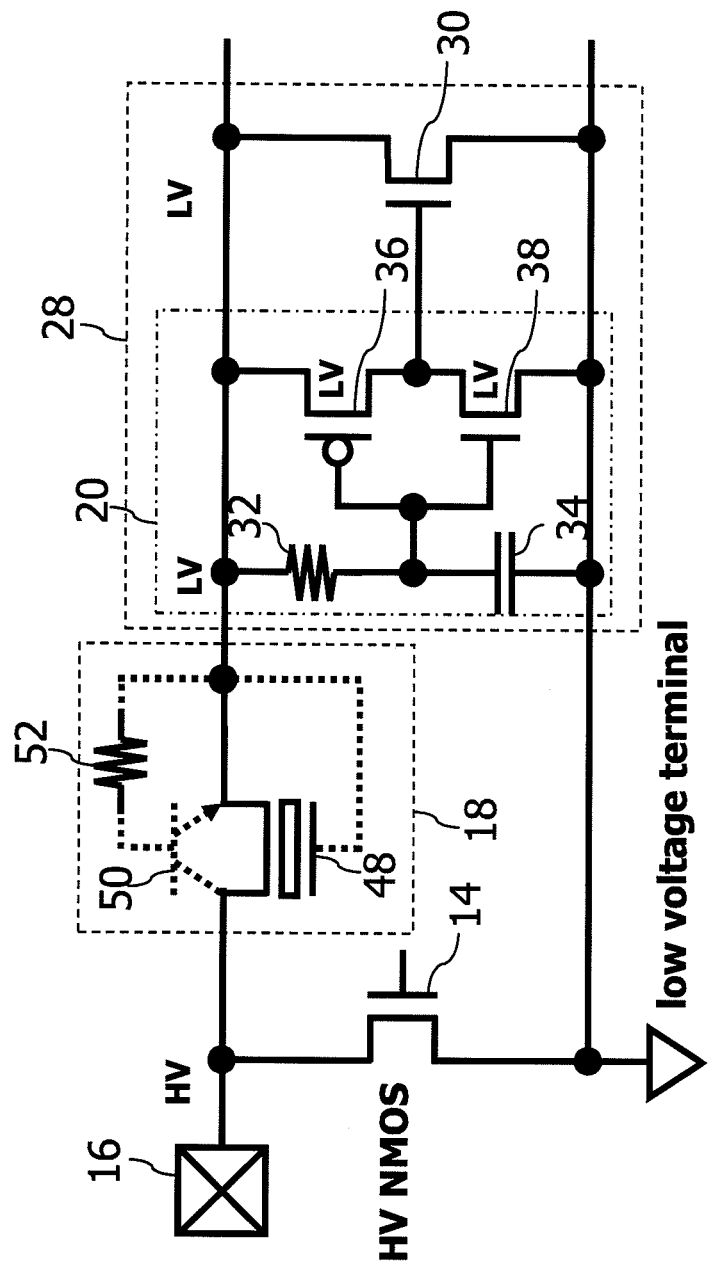
FIG. 8 schematically shows the circuit of a protection design according to the fifth embodiment of the present invention.

The fifth embodiment is introduced. Refer to FIG. 8. The fifth embodiment is different from the first embodiment in internal elements of the high-voltage ESD unit 18. The high-voltage ESD unit 18 is a field oxide device (FOD) 48 having a parasitic NPN bipolar junction transistor (BJT) 50. The parasitic NPN BJT 50 has a parasitic collector-to-base depletion capacitor, a parasitic collector-to-base reversed junction diode and a parasitic base-to-emitter resistor 52, wherein the gate and the source of the FOD 48 are coupled to each other, the drain of the FOD 48 is coupled to the first HV NMOSFET 14 and the high-voltage pad 16, and the source of the FOD 48 is coupled to the resistor 32, the source of the LV PMOSFET 36 and the drain of the NMOSFET used as the first ESD clamp element 30. The parasitic collector-to-base reversed junction diode can block the high voltage, and the parasitic collector-to-base depletion capacitor and the parasitic base-to-emitter resistor 52 receive the positive ESD voltage whereby the parasitic NPN BJT 50 is turned on to bypass the first ESD current. Additionally, the parasitic collector-to-base reversed junction diode of the FOD 48 receives the negative ESD voltage to bypass the second ESD current.

The FOD 48 can provide the abovementioned ESD discharge path to bypass the first ESD current from the high-voltage pad 16 to the low-voltage terminal VSS when the FOD 48 and the first ESD clamp element 30 face the positive ESD voltage potential.

For the operation of the fifth embodiment, the first HV NMOSFET 14 receives the high voltage on the high-voltage pad 16 to operate in the normal operation. At the same time, the parasitic collector-to-base reversed junction diode of the FOD 48 blocks the high voltage, so that the first trigger circuit 28 and the first ESD clamp element 30 will not be triggered on. When the positive ESD voltage appears at the high-voltage pad 16, the parasitic collector-to-base depletion capacitor and the parasitic base-to-emitter resistor 52 of the FOD 48 receive the positive ESD voltage to turn on the NPN BJT 50, and the capacitor 34 uses the positive ESD voltage to establish the low voltage signal at the first electrode. Then, the LV PMOSFET 36 and the first LV NMOSFET 38 receive the low voltage signal to output the trigger signal. The first ESD clamp element 30 receives the trigger signal to be turned on, so that the first ESD current flows from the high-voltage pad 16 to the low-voltage terminal through the parasitic NPN BJT 50 and the first ESD clamp element 30. When the negative ESD voltage appears at the high-voltage pad 16, the second ESD current flows from the low-voltage terminal to the high-voltage pad 16 through the first ESD clamp element 30 and the parasitic collector-to-base reversed junction diode of the FOD 48.

Figure 9:
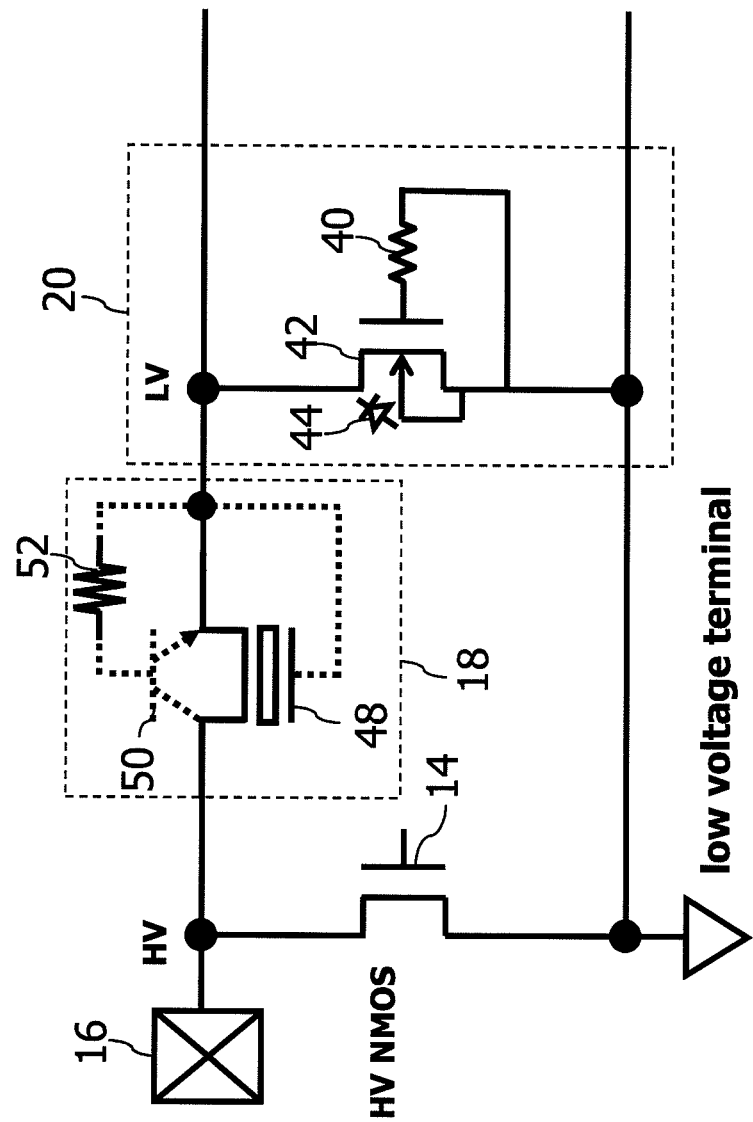
FIG. 9 schematically shows the circuit of a protection design according to the sixth embodiment of the present invention.

The sixth embodiment is introduced. Refer to FIG. 9. The sixth embodiment is different from the fifth embodiment in internal elements of the first power clamp unit 20. The first power clamp unit 20 comprises a resistor 40 and a clamp NMOSFET 42, such as a third LV NMOSFET or a forth HV NMOSFET. The drain of the clamp NMOSFET 42 is coupled to the resistor 22 and the drain of the FOD 48, and the source of the clamp NMOSFET 42 is coupled to the low-voltage terminal. Two ends of the resistor 40 are respectively coupled to the source and the gate of the clamp NMOSFET 42. The source and the body of the clamp NMOSFET 42 are coupled to each other. The clamp NMOSFET 42 has a parasitic drain-to-gate capacitor between the drain and the gate. The parasitic drain-to-gate capacitor and the resistor 40 receive the positive ESD voltage via the FOD 48 to turn on the clamp NMOSFET 42, whereby the clamp NMOSFET 42 and the resistor 40 bypass the first ESD current. Additional, the clamp NMOSFET 42 has a parasitic drain-to-body reversed junction diode 44 between the drain and the body, and the parasitic drain-to-body reversed junction diode 44 receives the negative ESD voltage via the FOD 48 to bypass the second ESD current.

Similarly, the clamp NMOSFET 42 can provide the abovementioned ESD discharge path to bypass the first ESD current from the high-voltage pad 16 to the low-voltage terminal VSS when the FOD 48 and the clamp NMOSFET 42 face the positive ESD voltage potential.

For the operation of the sixth embodiment, the first HV NMOSFET 14 receives the high voltage on the high-voltage pad 16 to operate in the normal operation. At the same time, the parasitic collector-to-base reversed junction diode of the FOD 48 blocks the high voltage, so that the clamp NMOSFET 42 will not be triggered on. When the positive ESD voltage appears at the high-voltage pad 16, the parasitic collector-to-base depletion capacitor and the parasitic base-to-emitter resistor 52 of the FOD 48 receive the positive ESD voltage to turn on the NPN BJT 50, and the resistor 40 receives the positive ESD voltage via the FOD 48 to turn on the clamp NMOSFET 42. Then, the first ESD current flows from the high-voltage pad 16 to the low-voltage terminal through the parasitic NPN BJT 50, the resistor 40 and the clamp NMOSFET 42. When the negative ESD voltage appears at the high-voltage pad 16, the second ESD current flows from the low-voltage terminal to the high-voltage pad 16 through the parasitic drain-to-body reversed junction diode 44 and the parasitic collector-to-base reversed junction diode of the FOD 48.

Figure 10:
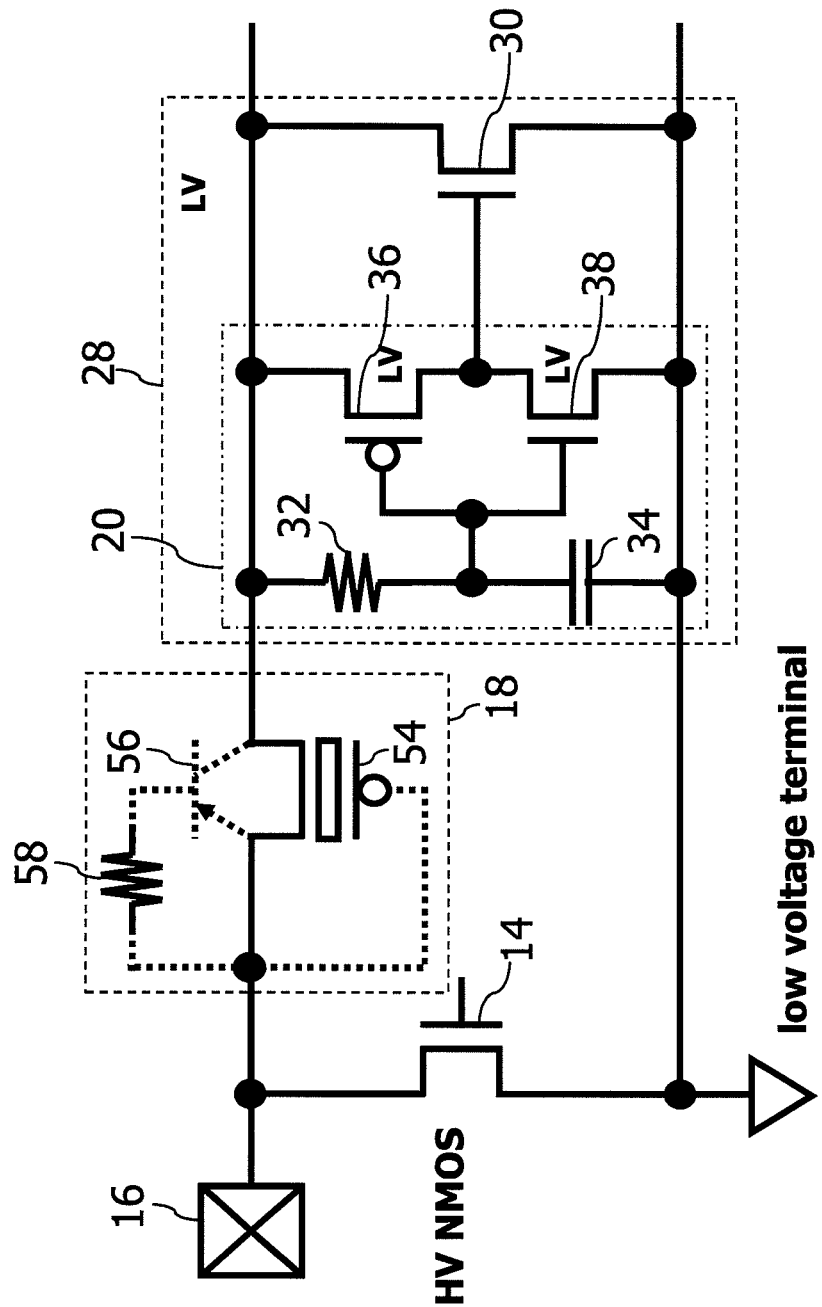
FIG. 10 schematically shows the circuit of a protection design according to the seventh embodiment of the present invention.

The seventh embodiment is introduced. Refer to FIG. 10. The seventh embodiment is different from the first embodiment in internal elements of the high-voltage ESD unit 18. The high-voltage ESD unit 18 is a FOD 54 having a parasitic PNP BJT 56. The parasitic PNP BJT 56 has a parasitic base-to-collector depletion capacitor, a parasitic base-to-collector reversed junction diode and a parasitic base-to-emitter resistor 58, wherein the gate and the source of the FOD 54 are coupled to each other, the source of the FOD 54 is coupled to the first HV NMOSFET 14 and the high-voltage pad 16, and the drain of the FOD 54 is coupled to the resistor 32, the source of the LV PMOSFET 36 and the drain of the NMOSFET used as the first ESD clamp element 30. The parasitic base-to-collector reversed junction diode can block the high voltage, and the parasitic base-to-collector depletion capacitor and the parasitic base-to-emitter resistor 58 receive the positive ESD voltage whereby the parasitic PNP BJT 50 i6 turned on to bypass the first ESD current. Additionally, the parasitic base-to-collector reversed junction diode of the FOD 54 receives the negative ESD voltage to bypass the second ESD current.

The FOD 54 can provide the abovementioned ESD discharge path to bypass the first ESD current from the high-voltage pad 16 to the low-voltage terminal VSS when the FOD 54 and the first ESD clamp element 30 face the positive ESD voltage potential.

For the operation of the seventh embodiment, the first HV NMOSFET 14 receives the high voltage on the high-voltage pad 16 to operate in the normal operation. At the same time, the parasitic base-to-collector reversed junction diode of the FOD 54 blocks the high voltage, so that the first trigger circuit 28 and the first ESD clamp element 30 will not be triggered on. When the positive ESD voltage appears at the high-voltage pad 16, the parasitic base-to-collector depletion capacitor and the parasitic base-to-emitter resistor 58 of the FOD 54 receive the positive ESD voltage to turn on the PNP BJT 56, and the capacitor 34 uses the positive ESD voltage to establish the low voltage signal at the first electrode. Then, the LV PMOSFET 36 and the first LV NMOSFET 38 receive the low voltage signal to output the trigger signal. The first ESD clamp element 30 receives the trigger signal to be turned on, so that the first ESD current flows from the high-voltage pad 16 to the low-voltage terminal through the parasitic PNP BJT 56 and the first ESD clamp element 30. When the negative ESD voltage appears at the high-voltage pad 16, the second ESD current flows from the low-voltage terminal to the high-voltage pad 16 through the first ESD clamp element 30 and the parasitic base-to-collector reversed junction diode of the FOD 54.

Figure 11:
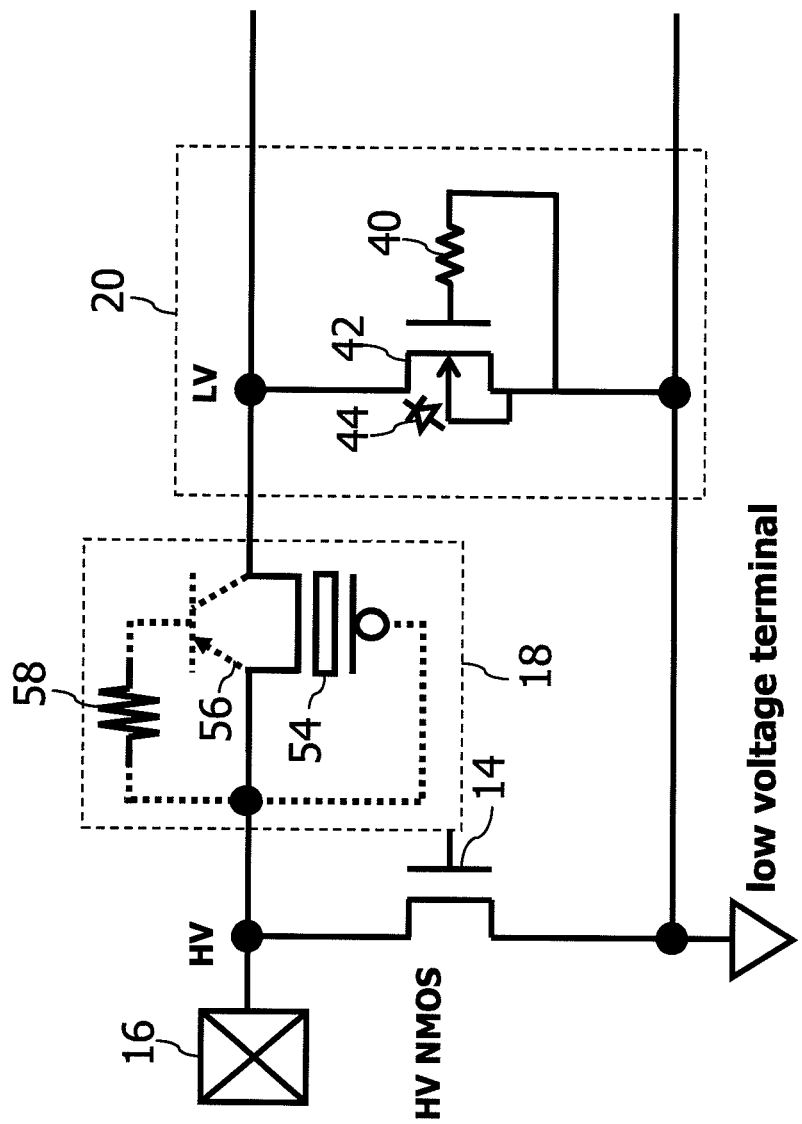
FIG. 11 schematically shows the circuit of a protection design according to the eighth embodiment of the present invention.

The eighth embodiment is introduced. Refer to FIG. 11. The eighth embodiment is different from the seventh embodiment in internal elements of the first power clamp unit 20. The first power clamp unit 20 comprises a resistor 40 and a clamp NMOSFET 42, such as a third LV NMOSFET or a forth HV NMOSFET. The drain of the clamp NMOSFET 42 is coupled to the resistor 22 and the drain of the FOD 54, and the source of the clamp NMOSFET 42 is coupled to the low-voltage terminal. Two ends of the resistor 40 are respectively coupled to the source and the gate of the clamp NMOSFET 42. The source and the body of the clamp NMOSFET 42 are coupled to each other. The clamp NMOSFET 42 has a parasitic drain-to-gate capacitor between the drain and the gate. The parasitic drain-to-gate capacitor and the resistor 40 receive the positive ESD voltage via the FOD 54 to turn on the clamp NMOSFET 42, whereby the clamp NMOSFET 42 and the resistor 40 bypass the first ESD current. Additional, the clamp NMOSFET 42 has a parasitic drain-to-body reversed junction diode 44 between the drain and the body, and the parasitic drain-to-body reversed junction diode 44 receives the negative ESD voltage via the FOD 54 to bypass the second ESD current.

Similarly, the clamp NMOSFET 42 can provide the abovementioned ESD discharge path to bypass the first ESD current from the high-voltage pad 16 to the low-voltage terminal VSS when the FOD 54 and the clamp NMOSFET 42 face the positive ESD voltage potential.

For the operation of the eighth embodiment, the first HV NMOSFET 14 receives the high voltage on the high-voltage pad 16 to operate in the normal operation. At the same time, the parasitic base-to-collector reversed junction diode of the FOD 54 blocks the high voltage, so that the clamp NMOSFET 42 will not be triggered on. When the positive ESD voltage appears at the high-voltage pad 16, the parasitic base-to-collector depletion capacitor and the parasitic base-to-emitter resistor 58 of the FOD 54 receive the positive ESD voltage to turn on the PNP BJT 56, and the resistor 40 receives the positive ESD voltage via the FOD 54 to turn on the clamp NMOSFET 42. Then, the first ESD current flows from the high-voltage pad 16 to the low-voltage terminal through the parasitic PNP BJT 56, the resistor 40 and the clamp NMOSFET 42. When the negative ESD voltage appears at the high-voltage pad 16, the second ESD current flows from the low-voltage terminal to the high-voltage pad 16 through the parasitic drain-to-body reversed junction diode 44 and the parasitic base-to-collector reversed junction diode of the FOD 54.

Figure 12:
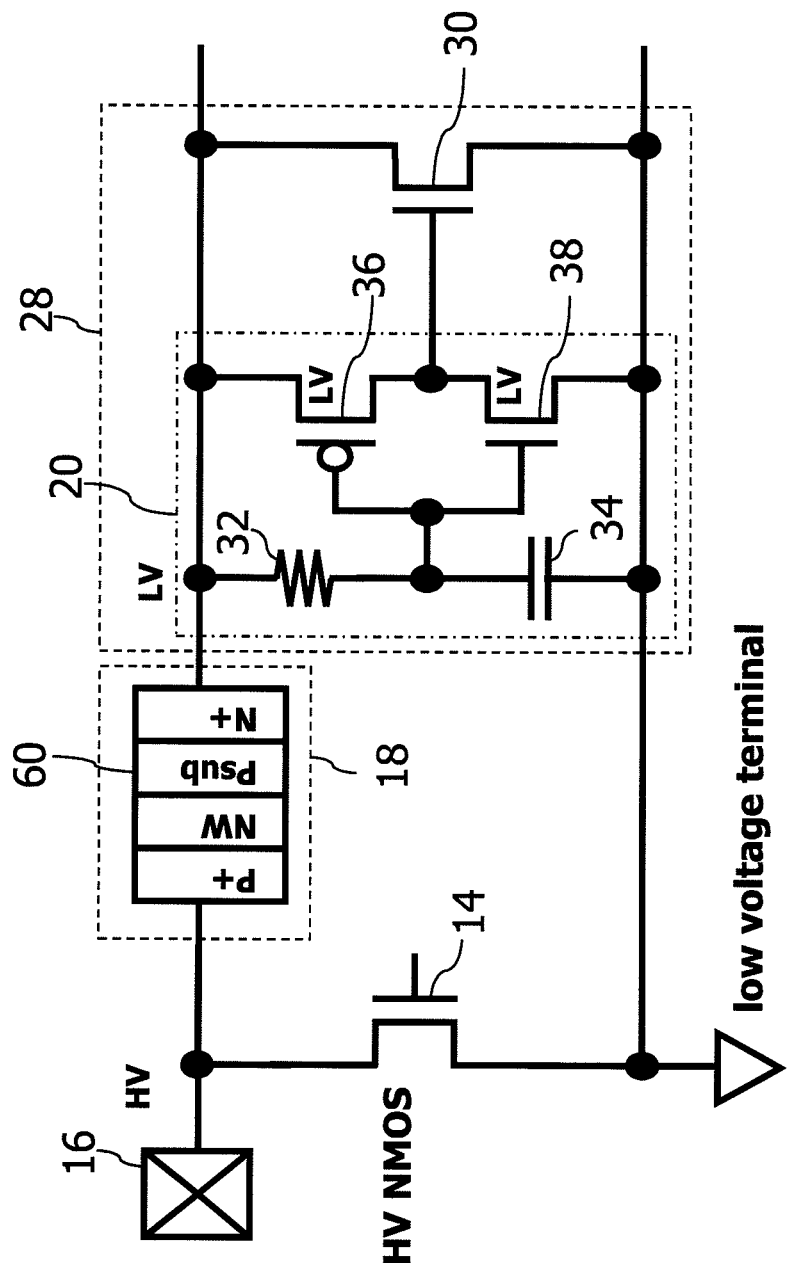
FIG. 12 schematically shows the circuit of a protection design according to the ninth embodiment of the present invention.

The ninth embodiment is introduced. Refer to FIG. 12. The ninth embodiment is different from the first embodiment in internal elements of the high-voltage ESD unit 18. The high-voltage ESD unit 18 is a silicon controlled rectifier (SCR) 60, such as a typical SCR, a modified lateral silicon controlled rectifier (MLSCR), or a low-voltage triggering silicon controlled rectifier (LVTSCR). The cathode of the SCR 60 is coupled to the resistor 32, the source of the LV PMOSFET 36 and the drain of the NMOSFET used as the first ESD clamp element 30, and the anode of the SCR 60 is coupled to the first HV NMOSFET 14 and the high-voltage pad 16.

The SCR 60 can provide the abovementioned ESD discharge path to bypass the first ESD current from the high-voltage pad 16 to the low-voltage terminal VSS when the SCR 60 and the first ESD clamp element 30 face the positive ESD voltage potential.

For the operation of the ninth embodiment, the first HV NMOSFET 14 receives the high voltage on the high-voltage pad 16 to operate in the normal operation. At the same time, the SCR 60 blocks the high voltage, so that the first trigger circuit 28 and the first ESD clamp element 30 will not be triggered on. When the positive ESD voltage appears at the high-voltage pad 16, the capacitor 34 uses the positive ESD voltage to establish the low voltage signal at the first electrode. Then, the LV PMOSFET 36 and the first LV NMOSFET 38 receive the low voltage signal to output the trigger signal. The first ESD clamp element 30 receives the trigger signal to be turned on, so that the first ESD current flows from the high-voltage pad 16 to the low-voltage terminal through the SCR 60 and the first ESD clamp element 30. When the negative ESD voltage appears at the high-voltage pad 16, the second ESD current flows from the low-voltage terminal to the high-voltage pad 16 through the first ESD clamp element 30 and the silicon controlled rectifier 60.

Figure 13:
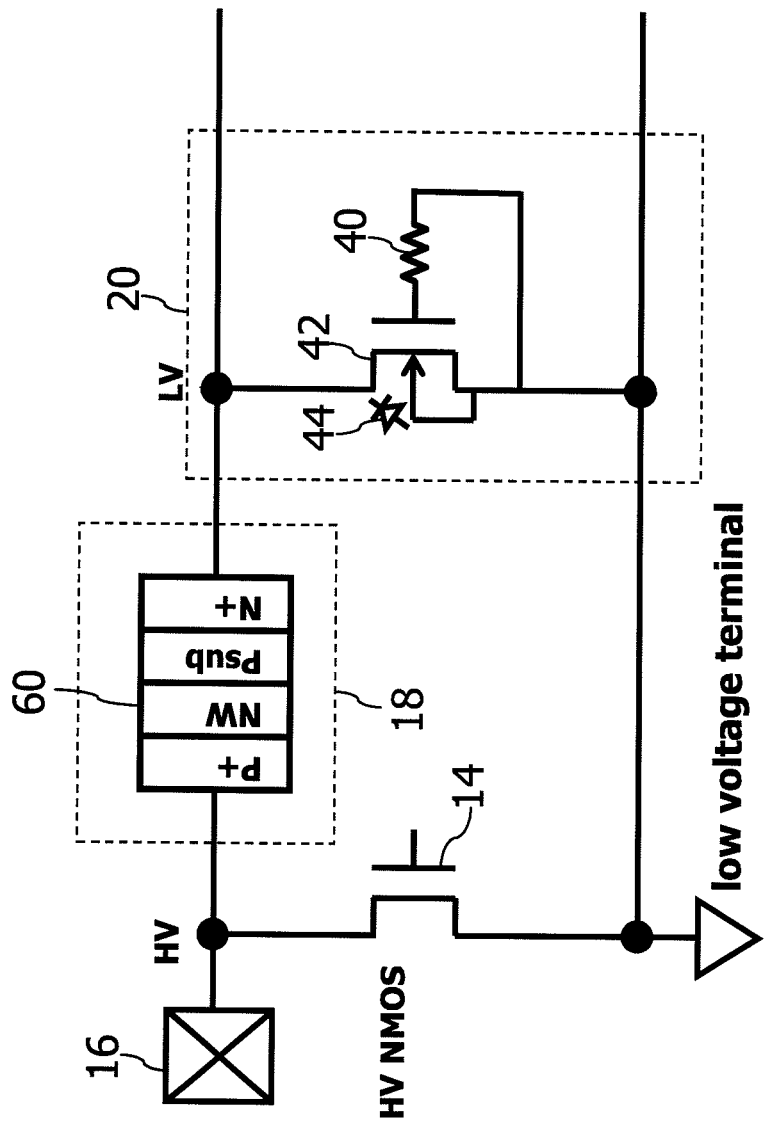
FIG. 13 schematically shows the circuit of a protection design according to the tenth embodiment of the present invention.

The tenth embodiment is introduced. Refer to FIG. 13. The tenth embodiment is different from the ninth embodiment in internal elements of the first power clamp unit 20. The first power clamp unit 20 comprises a resistor 40 and a clamp NMOSFET 42, such as a third LV NMOSFET or a forth HV NMOSFET. The drain of the clamp NMOSFET 42 is coupled to the resistor 22 and the cathode of the SCR 60, and the source of the clamp NMOSFET 42 is coupled to the low-voltage terminal. Two ends of the resistor 40 are respectively coupled to the source and the gate of the clamp NMOSFET 42. The source and the body of the clamp NMOSFET 42 are coupled to each other. The clamp NMOSFET 42 has a parasitic drain-to-gate capacitor between the drain and the gate. The parasitic drain-to-gate capacitor and the resistor 40 receive the positive ESD voltage via the SCR 60 to turn on the clamp NMOSFET 42, whereby the clamp NMOSFET 42 and the resistor 40 bypass the first ESD current. Additional, the clamp NMOSFET 42 has a parasitic drain-to-body reversed junction diode 44 between the drain and the body, and the parasitic drain-to-body reversed junction diode 44 receives the negative ESD voltage via the SCR 60 to bypass the second ESD current.

Similarly, the clamp NMOSFET 42 can provide the abovementioned ESD discharge path to bypass the first ESD current from the high-voltage pad 16 to the low-voltage terminal VSS when the SCR 60 and the clamp NMOSFET 42 face the positive ESD voltage potential.

For the operation of the tenth embodiment, the first HV NMOSFET 14 receives the high voltage on the high-voltage pad 16 to operate in the normal operation. At the same time, the SCR 60 blocks the high voltage, so that the clamp NMOSFET 42 will not be triggered on. When the positive ESD voltage appears at the high-voltage pad 16, the resistor 40 receives the positive ESD voltage via the SCR 60 to turn on the clamp NMOSFET 42. Then, the first ESD current flows from the high-voltage pad 16 to the low-voltage terminal through the SCR 60, the resistor 40 and the clamp NMOSFET 42. When the negative ESD voltage appears at the high-voltage pad 16, the second ESD current flows from the low-voltage terminal to the high-voltage pad 16 through the parasitic drain-to-body reversed junction diode 44 and the SCR 60.

Figure 14:
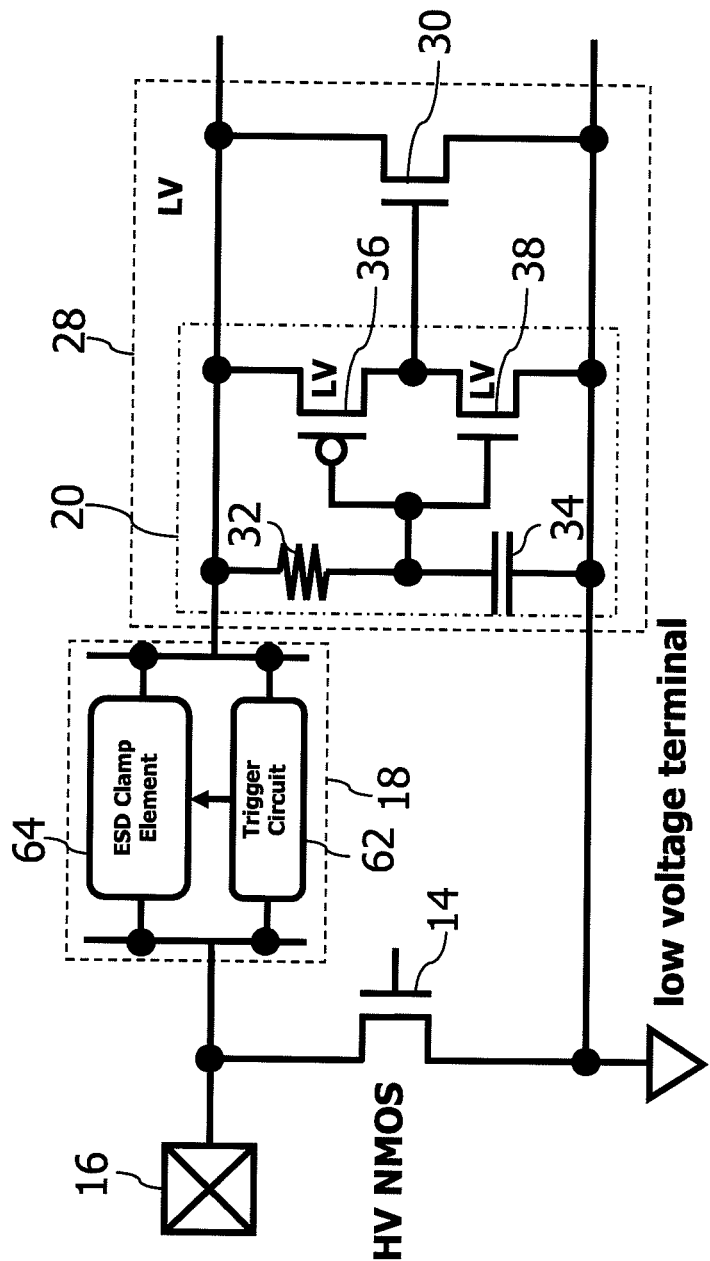
FIG. 14 schematically shows the circuit of a protection design according to the eleventh embodiment of the present invention.

The eleventh embodiment is introduced. Refer to FIG. 14. The eleventh embodiment is different from the first embodiment in internal elements of the high-voltage ESD unit 18. The high-voltage ESD unit 18 is a second power clamp unit comprising a second trigger circuit 62 and a second ESD clamp element 64. The second trigger circuit 62 and the second ESD clamp element 64 are coupled to the first HV NMOSFET 14, the high-voltage pad 16, the resistor 32, the source of the LV PMOSFET 36 and the drain of the NMOS- FET used as the first ESD clamp element 30. And, the second trigger circuit 62 and the second ESD clamp element 64 are coupled to each other. The second ESD clamp element 64 can block the high voltage on the high-voltage pad 16 or receive the negative ESD voltage to bypass the second ESD current. Besides, the second trigger circuit 62 can receive the positive ESD voltage to turn on the second ESD clamp element 64 and thereby bypass the first ESD current.

The second ESD clamp element 64 can provide the above-mentioned ESD discharge path to bypass the first ESD current from the high-voltage pad 16 to the low-voltage terminal VSS when the second ESD clamp element 64 and the first ESD clamp element 30 face the positive ESD voltage potential.

For the operation of the eleventh embodiment, the first HV NMOSFET 14 receives the high voltage on the high-voltage pad 16 to operate in the normal operation. At the same time, the second ESD clamp element 64 blocks the high voltage, so that the first trigger circuit 28 and the first ESD clamp element 30 will not be triggered on. When the positive ESD voltage appears at the high-voltage pad 16, the second trigger circuit 62 receives the positive ESD voltage to turn on the second ESD clamp element 64, and the capacitor 34 uses the positive ESD voltage to establish the low voltage signal at the first electrode. Then, the LV PMOSFET 36 and the first LV NMOSFET 38 receive the low voltage signal to output the trigger signal. The first ESD clamp element 30 receives the trigger signal to be turned on, so that the first ESD current flows from the high-voltage pad 16 to the low-voltage terminal through the second ESD clamp element 64 and the first ESD clamp element 30. When the negative ESD voltage appears at the high-voltage pad 16, the second ESD current flows from the low-voltage terminal to the high-voltage pad 16 through the first ESD clamp element 30 and the second ESD clamp element 64.

Figure 15:
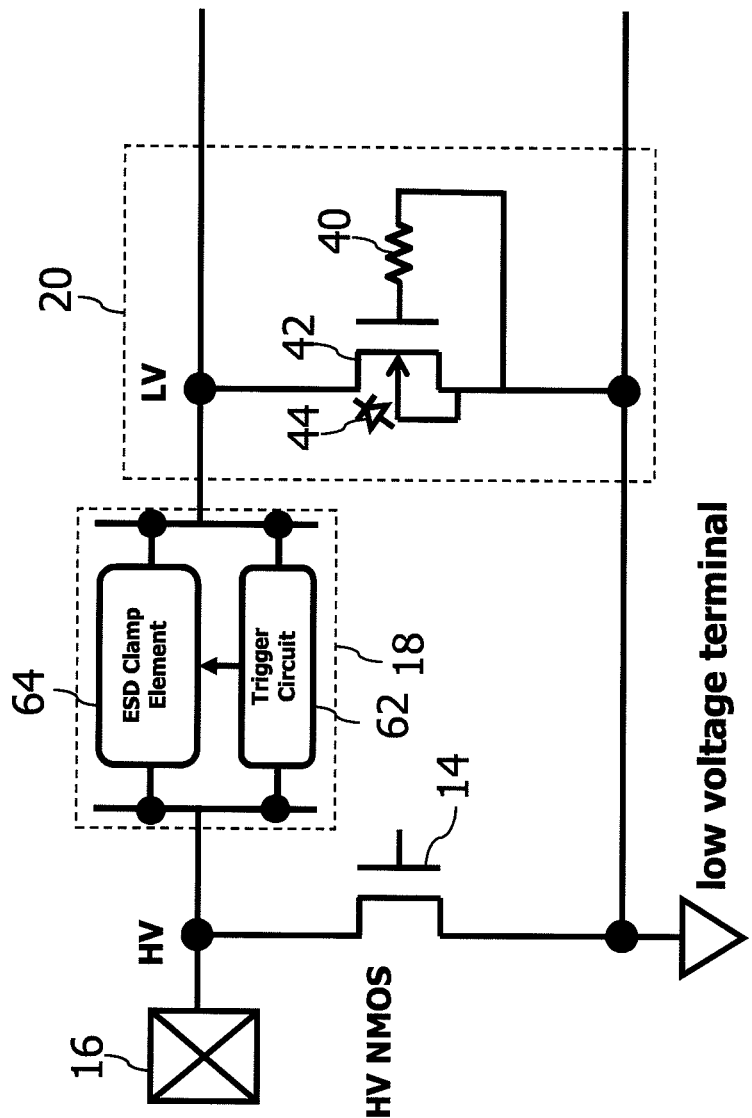
FIG. 15 schematically shows the circuit of a protection design according to the twelfth embodiment of the present invention.

The twelfth embodiment is introduced. Refer to FIG. 15. The twelfth embodiment is different from the eleventh embodiment in internal elements of the first power clamp unit 20. The first power clamp unit 20 comprises a resistor 40 and a clamp NMOSFET 42, such as a third LV NMOSFET or a forth HV NMOSFET. The drain of the clamp NMOSFET 42 is coupled to the second trigger circuit 62 and the second ESD clamp element 64, and the source of the clamp NMOSFET 42 is coupled to the low-voltage terminal. Two ends of the resistor 40 are respectively coupled to the source and the gate of the clamp NMOSFET 42. The source and the body of the clamp NMOSFET 42 are coupled to each other. The clamp NMOSFET 42 has a parasitic drain-to-gate capacitor between the drain and the gate. The parasitic drain-to-gate capacitor and the resistor 40 receive the positive ESD voltage via the second ESD clamp element 64 to turn on the clamp NMOSFET 42, whereby the clamp NMOSFET 42 and the resistor 40 bypass the first ESD current. Additional, the clamp NMOSFET 42 has a parasitic drain-to-body reversed junction diode 44 between the drain and the body, and the parasitic drain-to-body reversed junction diode 44 receives the negative ESD voltage via the second ESD clamp element 64 to bypass the second ESD current.

Similarly, the clamp NMOSFET 42 can provide the above-mentioned ESD discharge path to bypass the first ESD current from the high-voltage pad 16 to the low-voltage terminal VSS when the second ESD clamp element 64 and the clamp NMOSFET 42 face the positive ESD voltage potential.

For the operation of the twelfth embodiment, the first HV NMOSFET 14 receives the high voltage on the high-voltage pad 16 to operate in the normal operation. At the same time, the second ESD clamp element 64 blocks the high voltage, so that the clamp NMOSFET 42 will not be triggered on. When the positive ESD voltage appears at the high-voltage pad 16, the second trigger circuit 62 and the resistor 40 receive the positive ESD voltage to turn on the second ESD clamp element 64 and the clamp NMOSFET 42, respectively. Then, the first ESD current flows from the high-voltage pad 16 to the low-voltage terminal through the second ESD clamp element 64, the resistor 40 and the clamp NMOSFET 42. When the negative ESD voltage appears at the high-voltage pad 16, the second ESD current flows from the low-voltage terminal to the high-voltage pad 16 through the parasitic drain-to-body reversed junction diode 44 and the second ESD clamp element 64.

In the abovementioned embodiments, no HV PMOS is used and no extra MASK and layer for HV PMOS are required. In other words, the fabrication cost of the present invention is low.

In conclusion, the present invention only includes HV NMOS to achieve the low cost requirement.

The embodiments described above are only to exemplify the present invention but not to limit the scope of the present invention. Therefore, any equivalent modification or variation according to the shapes, structures, features, or spirit disclosed by the present invention is to be also included within the scope of the present invention.

What is claimed is:

1. A high voltage open-drain electrostatic discharge (ESD) protection device, comprising:
   a first high-voltage n-channel metal oxide semiconductor field effect transistor (HV NMOSFET) coupled to a high-voltage pad and a low-voltage terminal and receiving a high voltage on said high-voltage pad to operate in a normal operation;
   a high-voltage ESD unit coupled to said high-voltage pad and said first HV NMOSFET, blocking said high voltage, and receiving a positive ESD voltage or a negative ESD voltage on said high-voltage pad to bypass a first ESD current or a second ESD current respectively when an ESD event is applied to said high-voltage pad; and
   a first power clamp unit coupled to said high-voltage ESD unit and said low-voltage terminal, and receiving said positive ESD voltage via said high-voltage ESD unit to bypass said first ESD current.

2. The high voltage open-drain ESD protection device according to claim 1, wherein said first power clamp unit further comprises:
   a first trigger circuit coupled to said high-voltage ESD unit and said low-voltage terminal, and receiving said positive ESD voltage via said high-voltage ESD unit to generate a trigger signal; and
   a first ESD clamp element coupled to said high-voltage ESD unit, said first trigger circuit and said low-voltage terminal, and receiving said trigger signal to be turned on, so that said first ESD current is bypassed by flowing from said high-voltage pad to said low-voltage terminal through said high-voltage ESD unit and said first ESD clamp element.

3. The high voltage open-drain ESD protection device according to claim 2, wherein when said high-voltage ESD unit receives said negative ESD voltage, said second ESD current flows from said low-voltage terminal to said high-voltage pad through said first ESD clamp element and said high-voltage ESD unit.

4. The high voltage open-drain ESD protection device according to claim 1, wherein said high-voltage ESD unit further comprises:
   a resistor; and a second HV NMOSFET with a drain thereof is coupled to said first HV NMOSFET and said high-voltage pad, a source thereof is coupled to said first power clamp unit, wherein two ends of said resistor are respectively coupled to said source and a gate of said second HV NMOSFET, said source is coupled to a body of said second HV NMOSFET, said second HV NMOSFET has a parasitic drain-to-gate capacitor between said drain and said gate and a parasitic drain-to-body reversed junction diode between said drain and said body, and wherein said parasitic drain-to-body reversed junction diode blocks said high voltage, and wherein said parasitic drain-to-gate capacitor and said resistor receive said positive ESD voltage to turn on said second HV NMOSFET, whereby said second HV NMOSFET bypasses said first ESD current.

5. The high voltage open-drain ESD protection device according to claim 4, wherein said parasitic drain-to-body reversed junction diode receives said negative ESD voltage to bypass said second ESD current.

6. The high voltage open-drain ESD protection device according to claim 1, wherein said high-voltage ESD unit is a diode, an anode of said diode is coupled to said first power clamp unit, and a cathode of said diode is coupled to said first HV NMOSFET and said high-voltage pad.

7. The high voltage open-drain ESD protection device according to claim 1, wherein said high-voltage ESD unit is a field oxide device (FOD) having a parasitic NPN bipolar junction transistor (BJT), wherein said parasitic NPN BJT has a parasitic collector-to-base depletion capacitor, a parasitic collector-to-base reversed junction diode and a parasitic base-to-emitter resistor, and wherein a gate and a source of said FOD are coupled to each other, a drain of said FOD is coupled to said first HV NMOSFET and said high-voltage pad, and said source is coupled to said first power clamp unit, and wherein said parasitic collector-to-base reversed junction diode blocks said high voltage, and wherein said parasitic collector-to-base depletion capacitor and said parasitic base-to-emitter resistor receive said positive ESD voltage whereby said parasitic NPN BJT is turned on to bypass said first ESD current.

8. The high voltage open-drain ESD protection device according to claim 7, wherein said parasitic collector-to-base reversed junction diode receives said negative ESD voltage to bypass said second ESD current.

9. The high voltage open-drain ESD protection device according to claim 1, wherein said high-voltage ESD unit is a FOD having a parasitic PNP BJT, wherein said parasitic PNP BJT has a parasitic base-to-collector depletion capacitor, a parasitic base-to-collector reversed junction diode and a parasitic base-to-emitter resistor, and wherein a gate and an source of said FOD are coupled to each other, a drain of said FOD is coupled to said first power clamp unit, and said source is coupled to said first HV NMOSFET and said high-voltage pad, and wherein said parasitic base-to-collector reversed junction diode blocks said high voltage, and wherein said base-to-collector depletion capacitor and said base-to-emitter resistor receive said positive ESD voltage whereby said parasitic PNP BJT is turned on to bypass said first ESD current.

10. The high voltage open-drain ESD protection device according to claim 9, wherein said base-to-collector reversed junction diode receives said negative ESD voltage to bypass said second ESD current.

11. The high voltage open-drain ESD protection device according to claim 1, wherein said high-voltage ESD unit is a silicon controlled rectifier (SCR), a cathode of said SCR is coupled to said first power clamp unit, and an anode of said SCR is coupled to said first HV NMOSFET and said high-voltage pad.

12. The high voltage open-drain ESD protection device according to claim 11, wherein said SCR is a typical SCR, a modified lateral silicon controlled rectifier (MLSCR), or a low-voltage triggering silicon controlled rectifier (LVTSCR).

13. The high voltage open-drain ESD protection device according to claim 1, wherein said high-voltage ESD unit is a second power clamp unit comprising a second trigger circuit and a second ESD clamp element.

14. The high voltage open-drain ESD protection device according to claim 2, wherein said first trigger circuit further comprises:
   a resistor having a first terminal and a second terminal, wherein said first terminal is coupled to said high-voltage ESD unit and said first ESD clamp element;
   a capacitor having a first electrode and a second electrode, wherein said first electrode and said second electrode are respectively coupled to said second terminal and said low-voltage terminal, and wherein said capacitor receives said positive ESD voltage through said high-voltage ESD unit and said resistor to establish a low voltage signal at said first electrode;
   a low-voltage p-channel metal oxide semiconductor field oxide transistor (LV PMOSFET) with a gate thereof coupled to said second terminal and said first electrode, a source thereof coupled to said first terminal, said high-voltage ESD unit and said first ESD clamp element; and
   a first low-voltage n-channel metal oxide semiconductor field oxide transistor (LV NMOSFET) with a gate thereof coupled to said second terminal and said first electrode, a source thereof coupled to said second electrode, said first ESD clamp element, and said low-voltage terminal, and a drain thereof coupled to a drain of said LV PMOSFET, wherein said LV PMOSFET and said first LV NMOSFET, also known as an inverter, receive said low voltage signal to output said trigger signal.

15. The high voltage open-drain ESD protection device according to claim 2, wherein said first ESD clamp element is a second LV NMOSFET or a third HV NMOSFET, wherein a drain of said second LV NMOSFET or said third HV NMOSFET is coupled to said first trigger circuit and said high-voltage ESD unit, a source of said second LV NMOSFET or said third HV NMOSFET is coupled to said first trigger circuit and said low-voltage terminal, a gate of said second LV NMOSFET or said third HV NMOSFET is coupled to said first trigger circuit to receive said trigger signal to bypass said first ESD current.

16. The high voltage open-drain ESD protection device according to claim 1, wherein said first power clamp unit further comprises:
   a resistor; and
   a clamp NMOSFET with a drain thereof is coupled to said high-voltage ESD unit, a source thereof is coupled to said low-voltage terminal, wherein two ends of said resistor are respectively coupled to said source and a gate of said clamp NMOSFET, said source is coupled to a body of said clamp NMOSFET, said clamp NMOSFET has a parasitic drain-to-gate capacitor between said drain and said gate, and wherein said parasitic drain-to-gate capacitor and said resistor receive said positive ESD voltage via said high-voltage ESD unit to turn on said clamp NMOSFET, whereby said clamp NMOSFET bypasses said first ESD current.

17. The high voltage open-drain ESD protection device according to claim 16, wherein said clamp NMOSFET has a parasitic drain-to-body reversed junction diode between said drain and said body, and said parasitic drain-to-body reversed junction diode receives said negative ESD voltage via said high-voltage ESD unit to bypass said second ESD current.

18. The high voltage open-drain ESD protection device according to claim 16, wherein said clamp NMOSFET is a third LV NMOSFET or a forth HV NMOSFET.

19. The high voltage open-drain ESD protection device according to claim 1, wherein said low-voltage terminal has a grounding voltage.

\* \* \* \* \*